UNITED STATES PATENT OFFICE.

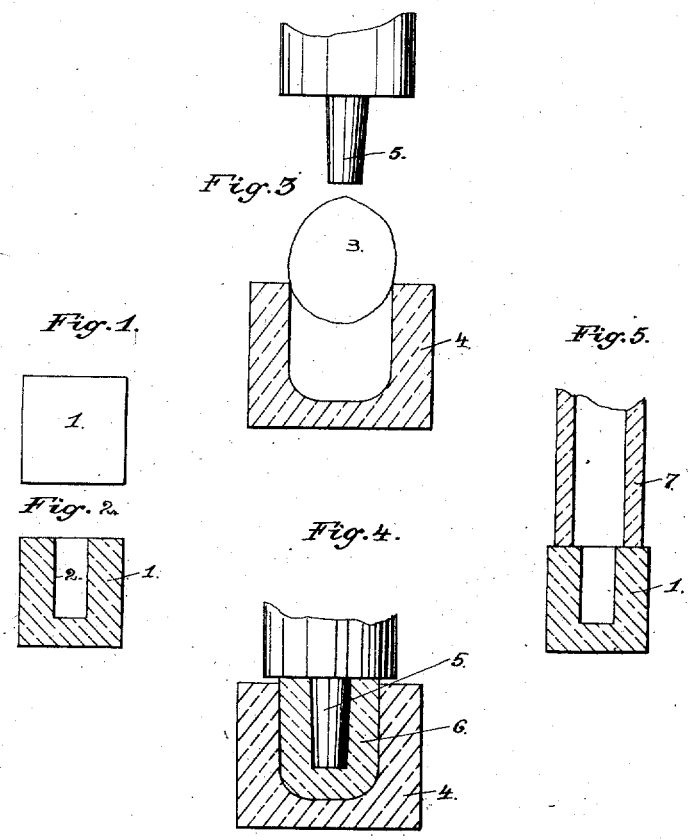

RICHARD KÜCH, OF HANAU, GERMANY, ASSIGNOR TO THE FIRM OF W. C. HARAEUS, OF HANAU, GERMANY.

PRODUCING HOLLOW QUARTZ-GLASS ARTICLES.

No. 805,303.      Specification of Letters Patent.      Patented Nov. 21, 1905.

Application filed November 17, 1904. Serial No. 233,215.

*To all whom it may concern:*

Be it known that I, RICHARD KÜCH, a subject of the German Emperor, and a resident of Hanau, Germany, have invented certain new and useful Improvements in Producing Hollow Quartz-Glass Articles, of which the following is a specification.

For producing hollow glass articles the glass-blower usually takes on an iron tube (the pipe) a lump of melted glass out of the glass-pot in the furnace and turns the pipe continuously while moving it backward, so as to wind the soft glass on the tube until it hangs from around the further end of the tube, after which the operator blows for the first time through the pipe to produce a glass bulb. The walls of the glass bulb being, however, always of irregular thickness, the operator is obliged to shape the bulb by the known marvering operation, during which the glass is exposed to a considerable cooling.

Quartz-glass requires to be heated up to a temperature exceeding 2,000° centigrade before it attains a soft condition required for blowing. For this reason it is impossible to form hollow glass articles from the quartz-glass in the ordinary manner indicated above. Shenstone has mentioned a method of producing hollow articles from quartz-glass; but this method is so very tedious as to be quite unfit for a practical manufacture. Other known methods, according to which a glass tube is formed by melting quartz-glass around a core of carbon in an electric furnace, can only result in the production of very dirty or unsightly articles, while it is the chief condition for the manufacture of useful wares that all impurities should be absolutely avoided.

My invention relates to a new method of producing hollow articles from quartz-glass in a simple and reliable manner.

The method consists in first producing a tubular quartz-glass block open at the top and closed at the bottom and of a great thickness and forming the desired article by subjecting the block to air-pressure and heat, as by attaching this block to a blowpipe of quartz-glass and afterward molding or working up this block in the usual manner with the aid of the flame of an oxyhydrogen-blowpipe.

I will now proceed to describe my new method, reference being had to the accompanying drawings, in which—

Figure 1 is an elevation of a solid cylindrical quartz-glass block. Fig. 2 is a vertical central section through the same after it has been centrally drilled. Fig. 3 is a vertical central section through a mold and an elevation of a quartz-glass lump about to be pressed therein and of a die. Fig. 4 is a vertical central section through the same mold and the lump after it has been pressed and an elevation of the same die within the block, and Fig. 5 is a vertical longitudinal section through the quartz-glass block shown at Fig. 2 and part of a quartz-glass blowpipe to which this block is attached.

Similar characters of reference refer to similar parts throughout the several views.

The first stage of my new method is to produce a tubular quartz-glass block open at the top and closed at the bottom. This may be effected in either of two processes. The first process is as follows: A suitable lump of quartz-glass is heated and softened by the flame of an oxyhydrogen-blowpipe and molded in the usual manner to a solid cylindrical block, or it may be pressed in a mold to form a solid cylindrical block 1. (Shown at Fig. 1.) When this block has become cold, a central hole 2 of, say, five millimeters diameter is drilled into the block in its longitudinal direction. (See Fig. 2.) The second process is as follows: A round-bodied lump 3 of quartz-glass is heated up to the highest possible temperature by means of the flame of an oxyhydrogen-blowpipe, then put over a mold 4 and pressed therein by means of a thin die 5, (see Fig. 3,) so that the tubular block 6 in Fig. 4 is formed of the lump 3. To facilitate the pressing of the block, the die 5 should be made slightly conical, so that it tapers downward and can be easily withdrawn from the pressed block. Both the mold 4 and the die 5 should be either covered with platina or made of platina or iridium. In either of the two processes a short tubular quartz-glass block 1 or 6 is obtained which is open at the top and closed at the bottom and is very thick. This tubular block 1 or 6 is then attached by melting in the ordinary manner to the end of the quartz-glass blowpipe 7 (see Fig. 5) or to the end of any present quartz-glass tube or hollow body and afterward molded or worked up with the aid of the flame of the oxyhydrogen-blowpipe by heating, blowing, and handling the same in substantially the manner ordinary hollow glass articles are produced by the aid of the blowpipe.

By this new method a great variety of hollow articles may be produced from quartz-glass—as, for instance, tubes, stills, crucibles, retorts for chemical and physical purposes, vacuum vessels for electrical and physical apparatus, &c.

What I claim as my invention, and desire to secure by Letters Patent, is—

1. The herein-described method of producing hollow quartz-glass articles, which consists in first heating and softening a lump of quartz-glass by means of the flame of an oxyhydrogen-blowpipe, then forming the lump into a cylindrical block having a central hole open at the top and closed at the bottom, thereupon attaching this tubular block by melting to the end of a quartz-glass blowpipe, and afterward molding or working up this block with the aid of the flame of the oxyhydrogen-blowpipe as usual.

2. The herein-described method of producing hollow quartz-glass articles, which consists in first heating and softening a lump of quartz-glass by means of the flame of an oxyhydrogen-blowpipe and molding it to a solid cylindrical block, then allowing this block to become cold, next drilling a central hole in this cold block, so that a tubular block open at the top and closed at the bottom is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

3. The herein-described method of producing hollow quartz-glass articles, which consists in first heating and softening a lump of quartz-glass by means of the flame of an oxyhydrogen-blowpipe and molding it to a solid cylindrical block, then allowing this block to become cold, next drilling a central hole of about five millimeters diameter in this cold block, so that a short tubular block open at the top and closed at the bottom and of great thickness is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

4. The herein-described method of producing hollow quartz-glass articles, which consists in first heating and softening a lump of quartz-glass by means of the flame of an oxyhydrogen-blowpipe, then pressing it in a mold to form a solid cylindrical block, next drilling a central hole into this solid block when cold, so that a tubular block open at the top and closed at the bottom is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

5. The herein-described method of producing hollow quartz-glass articles, which consists in first heating and softening a lump of quartz-glass by means of the flame of an oxyhydrogen-blowpipe, then pressing it in a mold to form a solid cylindrical block, next drilling a central hole of about five millimeters diameter in this solid block when cold, so that a short tubular block open at the top and closed at the bottom and of great thickness is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

In testimony whereof I have signed my name to this specification in the presence of two subscribing witnesses.

RICHARD KÜCH.

Witnesses:
FRANZ HASSLACHER,
ERWIN DIPPEL.

---

It is hereby certified that the name of the assignee in Letters Patent No. 805,303, granted November 21, 1905, upon the application of Richard Küch, of Hanau, Germany, for an improvement in "Producing Hollow Quartz-Glass Articles," was erroneously written and printed "the firm of W. C. Haraeus," whereas the said name should have been written and printed *the firm of W. C. Heraeus;* and that the said Letters Patent should be read with this correction therein that the same may conform to the record of the case in the Patent Office.

Signed and sealed this 5th day of December, A. D., 1905.

[SEAL.]

F. I. ALLEN,
*Commissioner of Patents.* terward molded or worked up with the aid of the flame of the oxyhydrogen-blowpipe by heating, blowing, and handling the same in substantially the manner ordinary hollow glass articles are produced by the aid of the blowpipe.

By this new method a great variety of hollow articles may be produced from quartz-glass—as, for instance, tubes, stills, crucibles, retorts for chemical and physical purposes, vacuum vessels for electrical and physical apparatus, &c.

What I claim as my invention, and desire to secure by Letters Patent, is—

1. The herein-described method of producing hollow quartz-glass articles, which consists in first heating and softening a lump of quartz-glass by means of the flame of an oxyhydrogen-blowpipe, then forming the lump into a cylindrical block having a central hole open at the top and closed at the bottom, thereupon attaching this tubular block by melting to the end of a quartz-glass blowpipe, and afterward molding or working up this block with the aid of the flame of the oxyhydrogen-blowpipe as usual.

2. The herein-described method of producing hollow quartz-glass articles, which consists in first heating and softening a lump of quartz-glass by means of the flame of an oxyhydrogen-blowpipe and molding it to a solid cylindrical block, then allowing this block to become cold, next drilling a central hole in this cold block, so that a tubular block open at the top and closed at the bottom is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

3. The herein-described method of producing hollow quartz-glass articles, which consists in first heating and softening a lump of quartz-glass by means of the flame of an oxyhydrogen-blowpipe and molding it to a solid cylindrical block, then allowing this block to become cold, next drilling a central hole of about five millimeters diameter in this cold block, so that a short tubular block open at the top and closed at the bottom and of great thickness is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

4. The herein-described method of producing hollow quartz-glass articles, which consists in first heating and softening a lump of quartz-glass by means of the flame of an oxyhydrogen-blowpipe, then pressing it in a mold to form a solid cylindrical block, next drilling a central hole into this solid block when cold, so that a tubular block open at the top and closed at the bottom is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

5. The herein-described method of producing hollow quartz-glass articles, which consists in first heating and softening a lump of quartz-glass by means of the flame of an oxyhydrogen-blowpipe, then pressing it in a mold to form a solid cylindrical block, next drilling a central hole of about five millimeters diameter in this solid block when cold, so that a short tubular block open at the top and closed at the bottom and of great thickness is produced, thereupon attaching this tubular block by melting to the end of a quartz-glass blowpipe or that of a quartz-glass tube or hollow body, and afterward molding or working up this block with the aid of the flame of the oxyhydrogen-blowpipe as usual.

In testimony whereof I have signed my name to this specification in the presence of two subscribing witnesses.

RICHARD KÜCH.

Witnesses:
FRANZ HASSLACHER,
ERWIN DIPPEL.

---

Correction in Letters Patent No. 805,303.

It is hereby certified that the name of the assignee in Letters Patent No. 805,303, granted November 21, 1905, upon the application of Richard Küch, of Hanau, Germany, for an improvement in "Producing Hollow Quartz-Glass Articles," was erroneously written and printed "the firm of W. C. Haraeus," whereas the said name should have been written and printed *the firm of W. C. Heraeus;* and that the said Letters Patent should be read with this correction therein that the same may conform to the record of the case in the Patent Office.

Signed and sealed this 5th day of December, A. D., 1905.

[SEAL.]

F. I. ALLEN,
*Commissioner of Patents.*

It is hereby certified that the name of the assignee in Letters Patent No. 805,303, granted November 21, 1905, upon the application of Richard Küch, of Hanau, Germany, for an improvement in "Producing Hollow Quartz-Glass Articles," was erroneously written and printed "the firm of W. C. Haraeus," whereas the said name should have been written and printed *the firm of W. C. Heraeus;* and that the said Letters Patent should be read with this correction therein that the same may conform to the record of the case in the Patent Office.

Signed and sealed this 5th day of December, A. D., 1905.

[SEAL.]

F. I. ALLEN,
*Commissioner of Patents.*